(12) United States Patent
Wilson

(10) Patent No.: US 7,044,493 B1
(45) Date of Patent: May 16, 2006

(54) TRAILER HITCH TOW BAR ASSEMBLY

(76) Inventor: Paul Wilson, 6731 Bridge St. #225, Fort Worth, TX (US) 76112

( * ) Notice: Subject to any disclaimer, the term of this patent is extended or adjusted under 35 U.S.C. 154(b) by 0 days.

(21) Appl. No.: 10/701,195

(22) Filed: Nov. 4, 2003

(51) Int. Cl.
*B60D 1/50* (2006.01)

(52) U.S. Cl. .................... 280/489; 280/474; 280/490.1

(58) Field of Classification Search .............. 280/483, 280/486, 490.1, 474, 489; 403/91, 92, 111
See application file for complete search history.

(56) References Cited

U.S. PATENT DOCUMENTS

| | | | |
|---|---|---|---|
| 2,634,986 A * | 4/1953 | McDaniel | 280/489 |
| 2,789,834 A | 4/1957 | Chism | |
| 2,797,934 A | 7/1957 | Helgeson | |
| 2,852,274 A | 9/1958 | Seiley | |
| 2,966,369 A | 12/1960 | Paul, Jr. | |
| 3,223,435 A | 12/1965 | Yarbrough | |
| 3,414,294 A | 12/1968 | Moulton | |
| 3,534,981 A * | 10/1970 | Moulton | 280/405.1 |
| 3,692,331 A * | 9/1972 | Vegors | 280/405.1 |
| 3,700,053 A * | 10/1972 | Glissendorf | 177/136 |
| 3,756,618 A | 9/1973 | Lewis | |
| 4,214,634 A * | 7/1980 | Rau et al. | 172/179 |
| 4,215,876 A | 8/1980 | Jacks | |
| 4,351,542 A | 9/1982 | Lovell et al. | |
| 4,792,154 A | 12/1988 | Kerst et al. | |
| 5,240,273 A * | 8/1993 | Stead et al. | 280/489 |
| 5,658,003 A * | 8/1997 | Jensen | 280/474 |
| 5,823,560 A | 10/1998 | van Vleet | |
| 5,836,603 A | 11/1998 | Logan et al. | |
| 5,887,884 A * | 3/1999 | Smith | 280/489 |
| 6,116,631 A | 9/2000 | Logan et al. | |
| 6,494,478 B1 | 12/2002 | MacKarvich | |

* cited by examiner

*Primary Examiner*—Kevin Hurley
(74) *Attorney, Agent, or Firm*—Susan L. Firestone; Paul W. O'Malley

(57) ABSTRACT

The invention is a tow bar assembly used for towing trailers with vehicles. The tow bar assembly is located between the vehicle and the hitch assembly, such as a ball mount hitch assembly.

13 Claims, 7 Drawing Sheets

TRAILER HITCH TOW BAR ASSEMBLY

BACKGROUND OF THE INVENTION

1. Field of the Invention

The present invention relates to a tow bar assembly used with hitches for vehicles.

2. Description of the Prior Art

Vehicles, such as light weight trucks and cars often tow trailers for a variety of uses, such as hauling cargo, campers and boats. There are many types of tow systems used, depending on the manufacturer and the type and weight of the towed trailer.

Current trailer hitch assemblies are designed to be used with a simple tow bar. The simple tow bar does not counteract the force applied by the trailer during driving. Because many trailers are heavy and bulky, a heavy towed trailer stresses not only the vehicle, but the driver as well. This stress is typically vibrational which is translated from the trailer to the tow bar to the vehicle and further to the driver. While driving, the trailer can also translate bumps and other road defects to the vehicle. Over long distances, the driver and vehicle become increasingly stressed, leading to wear and tear on the vehicle and driver fatigue.

Assemblies used to counteract the tow force are usually incorporated with the trailer's towing assembly, not between the vehicle and the hitch. Furthermore, these assemblies are often complex and are not readily disassembled. If the driver has trailers using different types of weight distribution or towing systems, the driver must either match the tow bar with the type of trailer's towing assembly or prepare to suffer the stresses caused by towing using that particular trailer.

Therefore, a need exists for an assembly located between the hitch and vehicle that can be used for a variety of towing systems. The assembly should readily adapt to the different types of towing systems or weight distribution systems without requiring lengthy disassembly times or even the replacement of the hitch assembly. The assembly should also reduce stress on the vehicle during towing.

SUMMARY OF THE INVENTION

The invention relates to a tow bar assembly for a vehicle, such as a motor vehicle. The tow bar assembly has a pivot joint and a spring on one side of the pivot joint. A first member of the pivot joint pivotally engages a second member of the pivot joint to allow the joint to pivot in a vertical direction. The spring is located between and attached to the first and second members. The spring is preferably adjustable in order to adjust the tension of the spring.

Additional effects, features and advantages will be apparent in the written description that follows.

DETAILED DESCRIPTION OF THE INVENTION

The tow bar assembly of the invention is used for campers, boats, cargo trailers, and the like, and can replace tow bars, such as a bumper pull type of tow bar. The tow bar assembly of the invention may be used with a standard torsion weight distribution hitch design with or without a tow bar weight distribution system. The tow bar assembly (in a smaller version) may be used with smaller, nonweight distribution receivers that allow detachment of the tow bar from the vehicle. The tow bar assembly attaches to a ball mount, or other types of mounts commonly used for towing.

Figure 3:
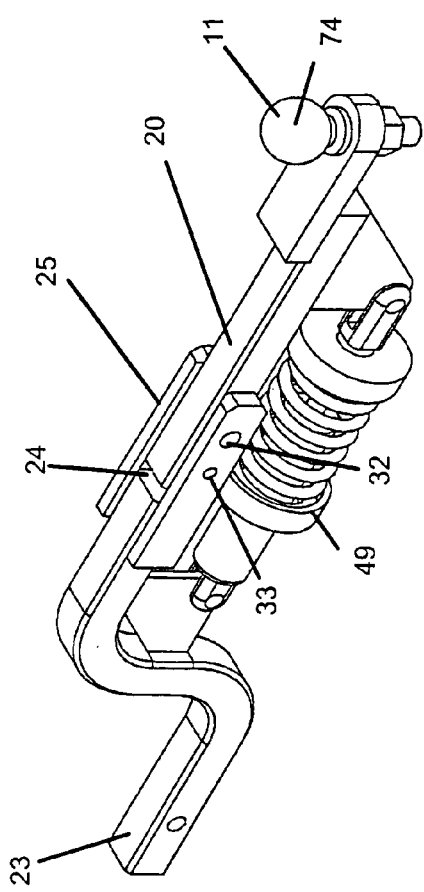
FIG. 3 is a top perspective view of a second configuration of a tow bar assembly of the invention using a coil type of spring.
Figure 4:
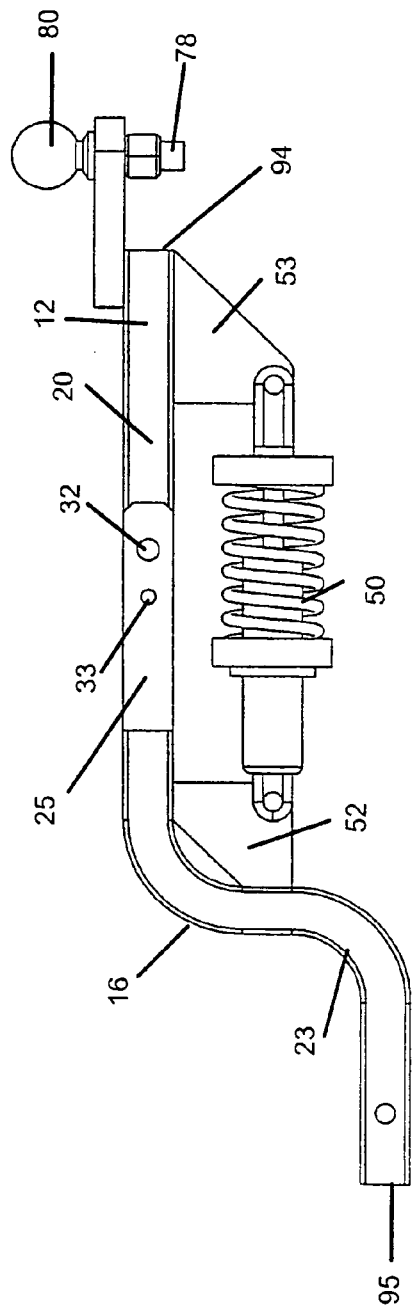
FIG. 4 is a side view of a second configuration of a tow bar assembly of the invention using a coil type of spring.
Figure 6:
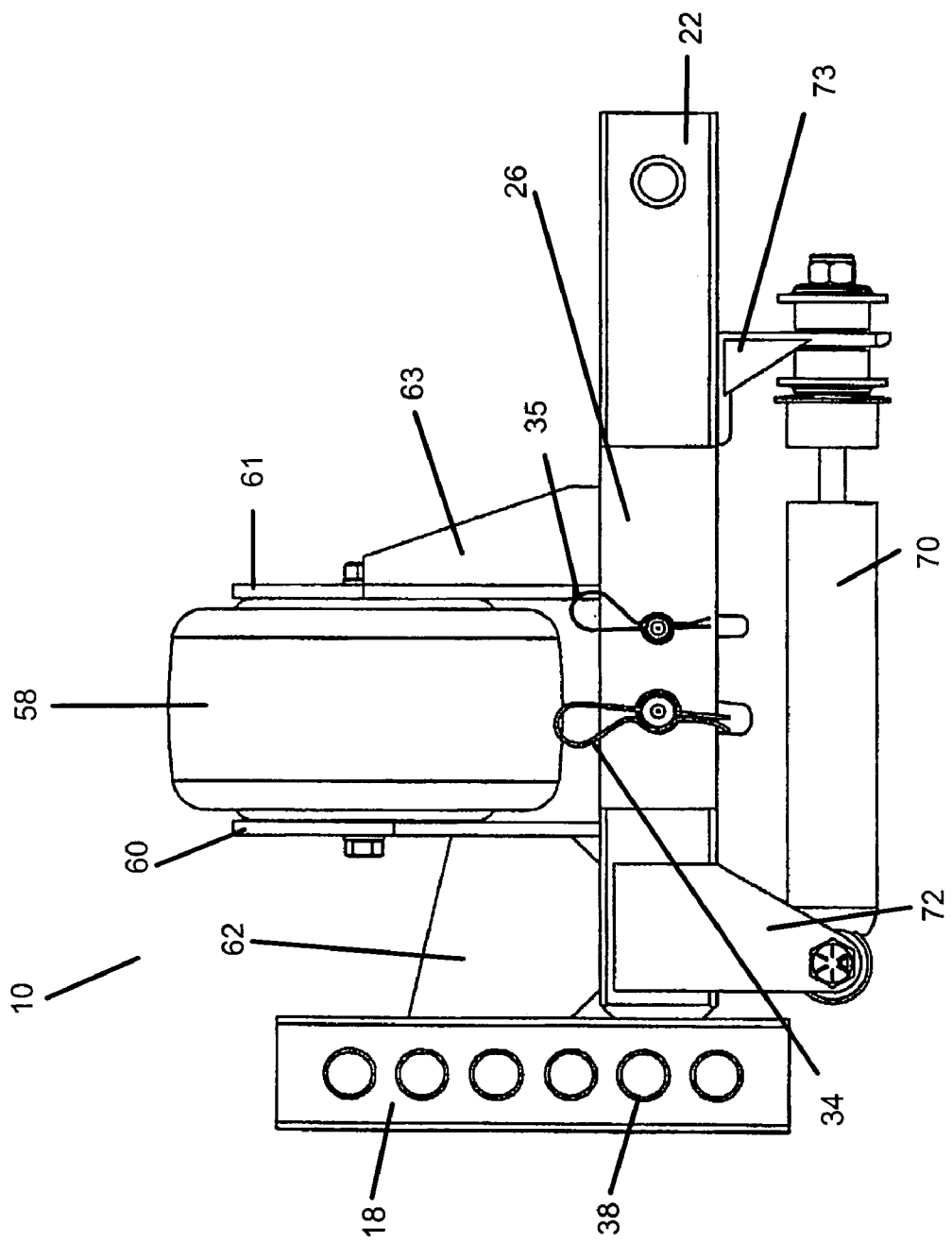
FIG. 6 is a side view of a tow bar assembly of the invention using an air spring.
Figure 7:
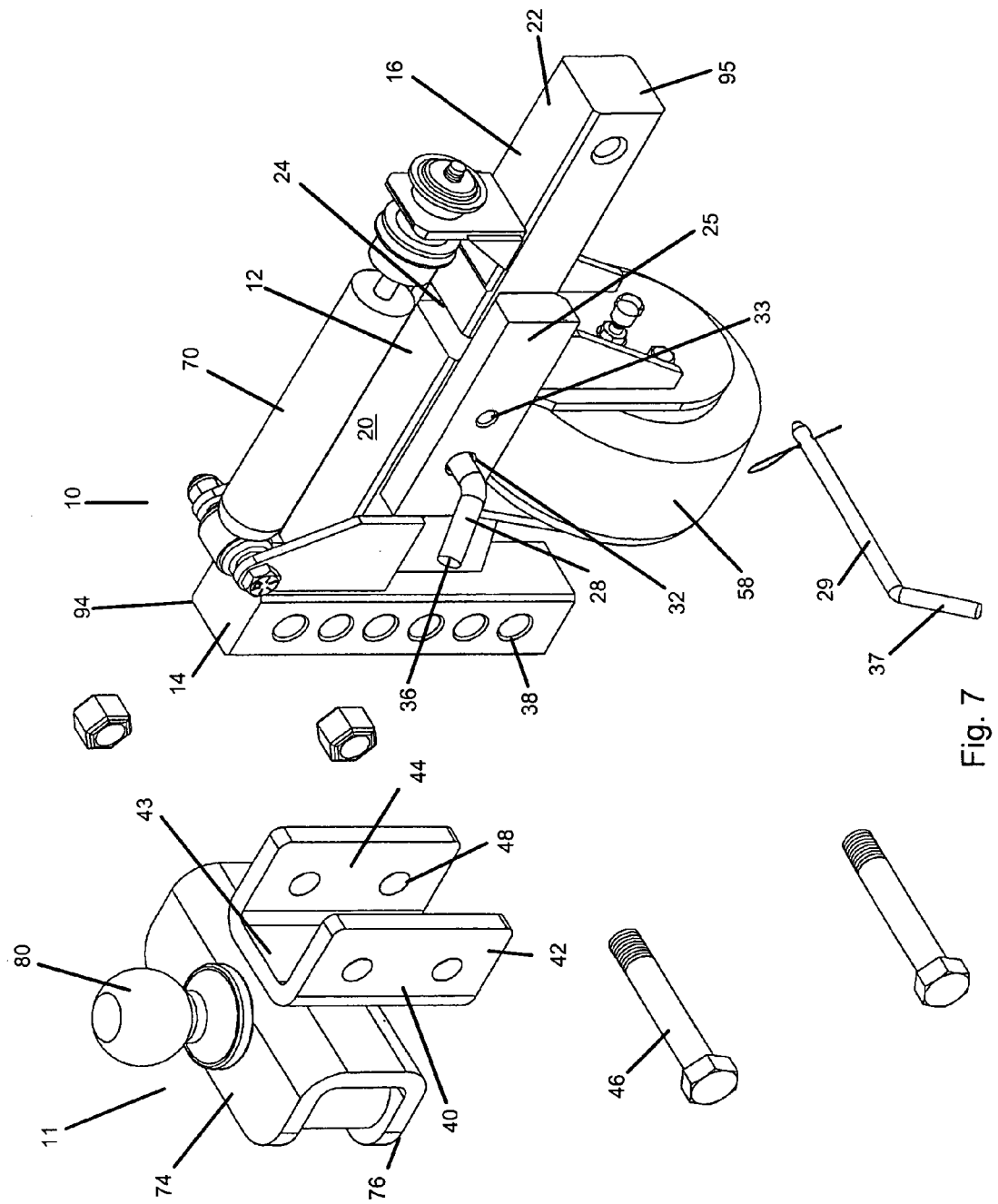
FIG. 7 is a partially exploded perspective view of a tow bar assembly of the invention using an air spring.
Figure 8:
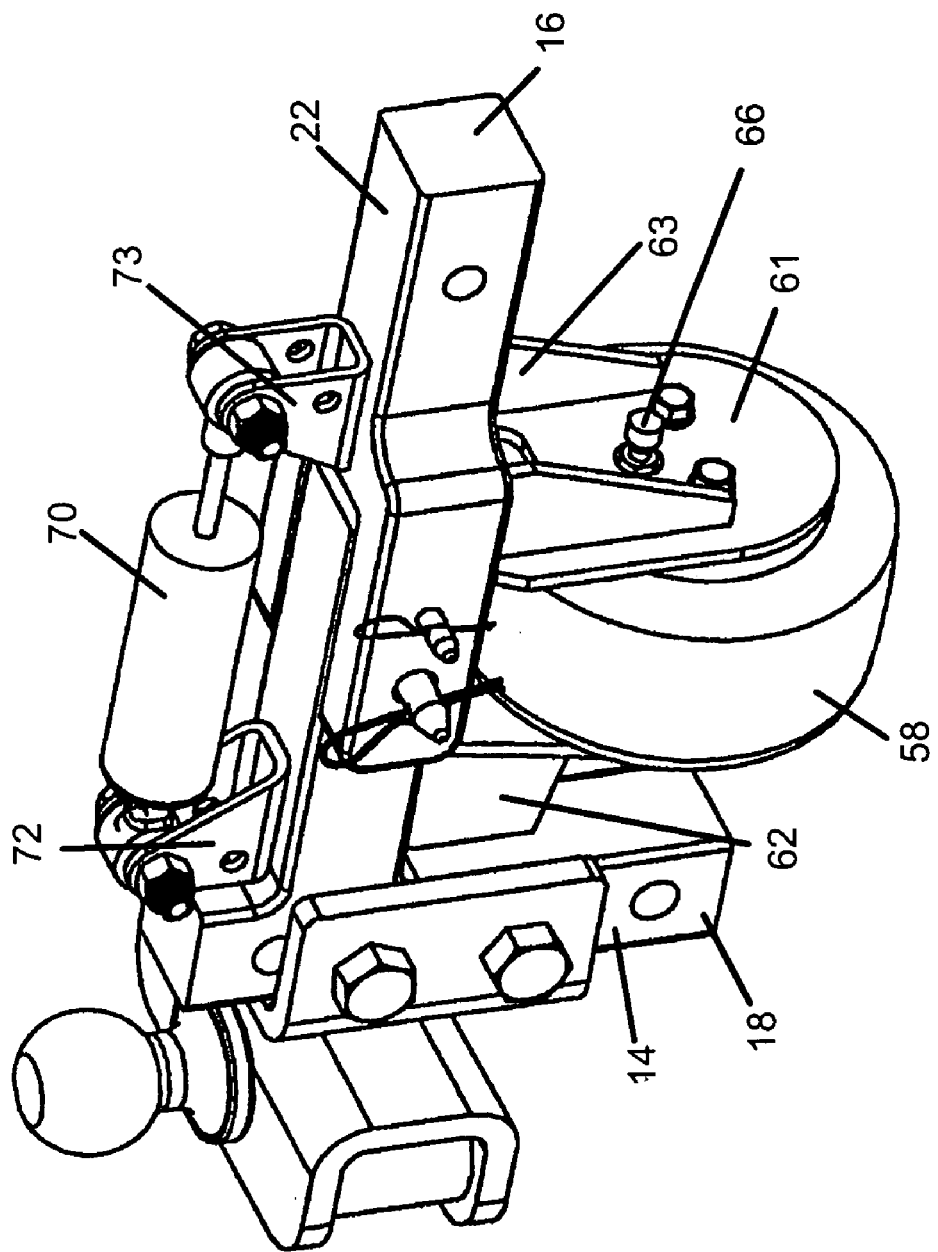
FIG. 8 is side perspective view of a tow bar assembly of the invention using an air spring.

Referring to the Figures, where like reference numerals refer to like structures, tow bar assembly 10 has pivot joint 12 formed by first 14 and second 16 members that pivot vertically in relation to each other. Pivot joint 12 has opposite first 94 and second 95 ends. Tongue 20 of first member 14 pivotally engages second member 16. First member 14 has tongue 20 and bar 18 projecting transversely from tongue 20 (FIG. 1) or tongue 20 alone as shown in FIG. 3 with hitch assembly 11 welded to tongue 20. Second member 16 has slot 24 located at one end of base 22 to engage tongue 20. Slot 24 is defined by prongs 26 projecting from one end of base 22 (FIG. 1) or by side bars 25 attached to base 23 (FIG. 3). If tongue 20 is rectangular, slot 24 is a U-shape. Alternatively, the first member can have the slot transverse to the bar and the second member can have either a tongue at one end of the base or the base itself can be the tongue with one end fitting within the slot (not shown). Base 22, 23 can be straight or curved (FIG. 3).

Pivot pin 28 extends through pivot openings 32 in first 14 and second 16 members. Pivot pin 28 preferably inserts through both tongue 20 and prongs 26 or sidebars 25 and extends from one side of tow bar assembly 10 to the opposite side. Pivot pin 28 can have pin clip 34 opposite pin head 36.

Pivot lock 27 temporarily prevents pivot joint 12 from pivoting. Pivot lock 27 can be any mechanism, such as gauge pin 29 inserting within gauge openings 33 in first 14 and second 16 members, projections extending outwardly from the first and second members and engaging a locking clip, band or spring (not shown), and the like. Gauge pin 29 inserts through gauge openings 33 in both tongue 20 and prongs 26 or sidebars 25 and preferably extends from one side of tow bar assembly 10 to the opposite side. Gauge pin 29 can have gauge pin clip 35 opposite gauge pin head 37. Gauge openings 33 are preferably oversized. While gauge pin 29 is in place, tow bar assembly 10 is locked in position and cannot pivot.

Spring 49 spans pivot joint 12 between first 52 and second 53 spring brackets attached to first 14 and second 16 members respectively. First spring bracket 52 mounts to bar 18 or tongue 20 of first member 14. Second spring bracket 53 mounts to base 22 of second member 16. Spring fasteners 54 fasten opposite first 56 and second 57 ends of spring 50 to first 52 and second spring 53 brackets.

Spring 49 can be a mechanical spring, such as coil spring 50 in FIGS. 1–4, torsion bar, or leaf spring, or a compressible fluid spring, such as air spring 58 in FIGS. 5–8. Preferably, spring's 49 tension is adjustable. Coil spring 50, for example, has adjusting nut 51 that allows the user to loosen or tighten the spring tension while tow bar assembly 10 is locked.

Turning to FIGS. 5–8, air spring 58 mounts to plates 60,61 of first 62 and second 63 spring brackets with air bag 64 between plates 60, 61. The amount of air in air bag 64 is adjusted by pumping air through air bag valve 66 which extends through an aperture in plate 60, preferably when tow bar assembly 10 is locked with gauge pin 29 in place.

Shock absorber 70 is located on the side of pivot joint 12 opposite air spring 58. Shock absorber 70 spans pivot joint 12 between first 72 and second 73 shock brackets attached to first 14 and second 16 members respectively.

First end 94 of pivot joint 12, such as bar 18, fastens to hitch assembly 11. Bar 18 fits within sleeve 40. While sleeve 40 is preferably U-shaped with first 42, second 43 and third 44 sides, sleeve 40 could also be tubular with bar 18 inserted therein. Bar 18 can have throughholes 38. Sleeve fasteners 46 releasably fasten bar 18 and sleeve 40 together, preferably by extending through throughholes 38 and sleeve openings 48.

The user assembles the towing system by placing second end 95 of pivot joint 12 into receiver 82, usually after placing first end 94 of pivot joint 12 into hitch assembly 11. Sleeve 40 of hitch assembly 11 attaches to one side of hitch frame 76, such as transversely at second side 43. Ball apparatus 74 connects with hitch frame 76, such as with stem 78 extending from ball 80. Hitch frame 76 attaches to trailer tongue 92. Opposite hitch assembly 11, second member 16 matingly engages socket 84 of receiver 82 attached to vehicle 86, such as by inserting base 22 into socket 84.

The tow bar assembly of the invention easily allows the user to adjust the spring tension to counteract the force from the trailer tongue. After attaching hitch frame 76 to trailer tongue 92, the user can adjust spring 49 to balance the force exerted by the trailer tongue 92. Pivot lock 27 is engaged while adjusting spring 49 tension. Gauge pin 29 of tow bar assembly 10, for example, is preferably within gauge openings 33. Coil spring 50 adjusts by turning adjusting nut 51 to tighten or loosen coil spring 50, depending on the force exerted by trailer tongue 92. Air spring 58 adjusts by pumping air through air bag valve 66 into air bag 64. When the tension of spring 49 is loose, such as when air bag 64 is empty, gauge pin 29 fits tightly within gauge openings 33. When the tension of spring 49 is sufficient, such as after air pressure is added to air spring 58 or the adjusting nut 51 of coil spring 50 is tightened, gauge pin 29 loosens within oversized gauge openings 33 and can be removed. After removing pivot lock 27, spring 49 is set for the load and pivot joint 12 can pivot. To remove the trailer, pivot lock, such as gauge pin 29 reinserted within gauge opening 33, relocks pivot joint 12 and if desired, release the spring tension.

The spring is used either on the top or bottom of the tow bar assembly, depending on the type of weight distribution system for the trailer. When a tow bar assembly is used with a dead weight distribution system, the tow bar assembly has the spring oriented on the bottom as shown in FIGS. 2–4 and 8. Placing the spring in this orientation allows the spring to apply upward force to overcome the downward force of the weight of the trailer tongue (not shown).

Figure 1:
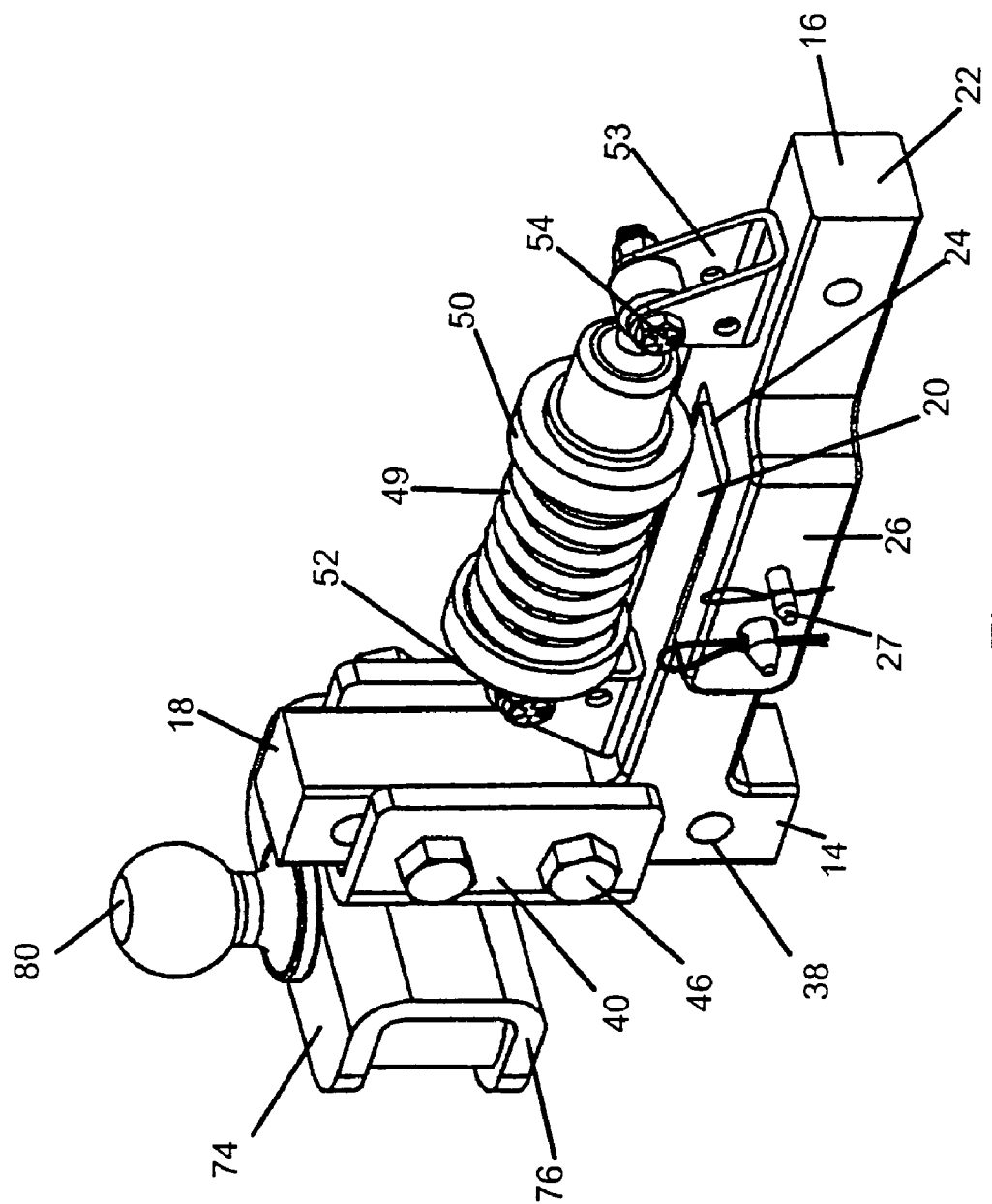
FIG. 1 is a side perspective view of a tow bar assembly of the invention using a coil type of spring.
Figure 2:
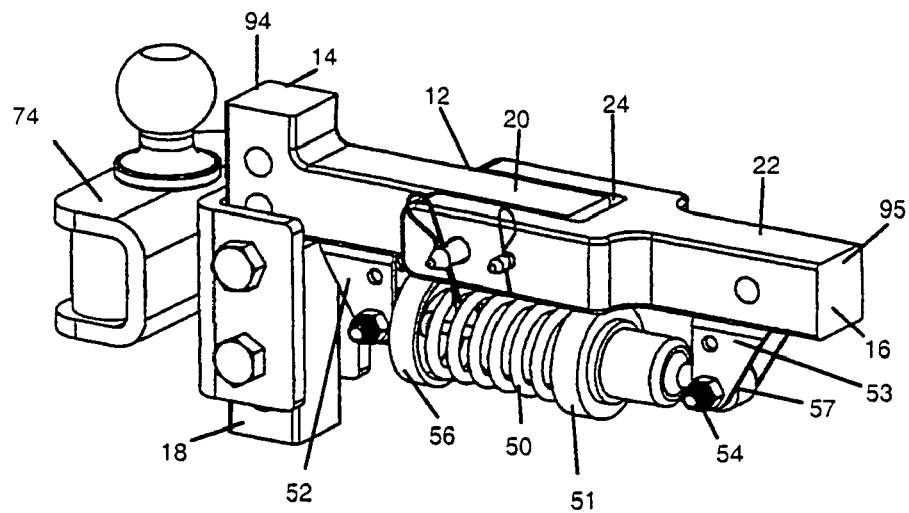
FIG. 2 is side perspective view of a tow bar assembly of the invention using a coil type of spring.
Figure 5:
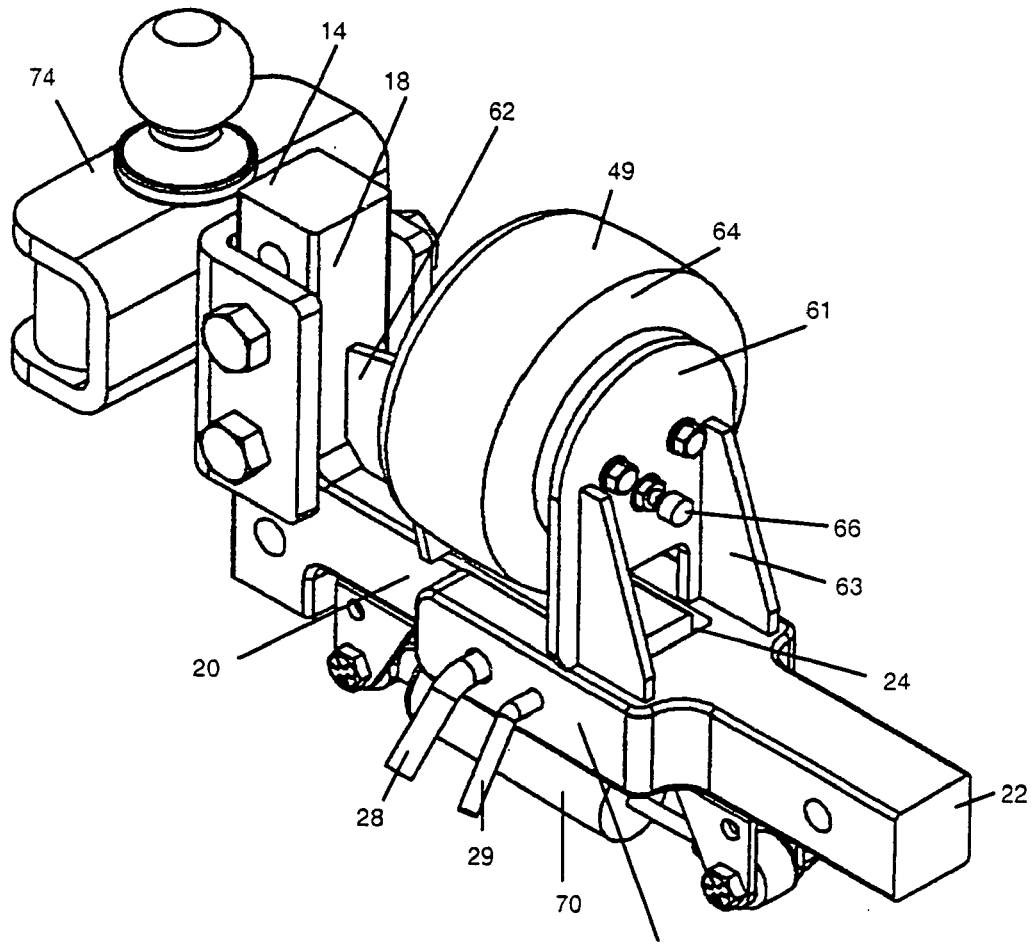
FIG. 5 is a top perspective view of a tow bar assembly of the invention using an air spring.
Figure 9:
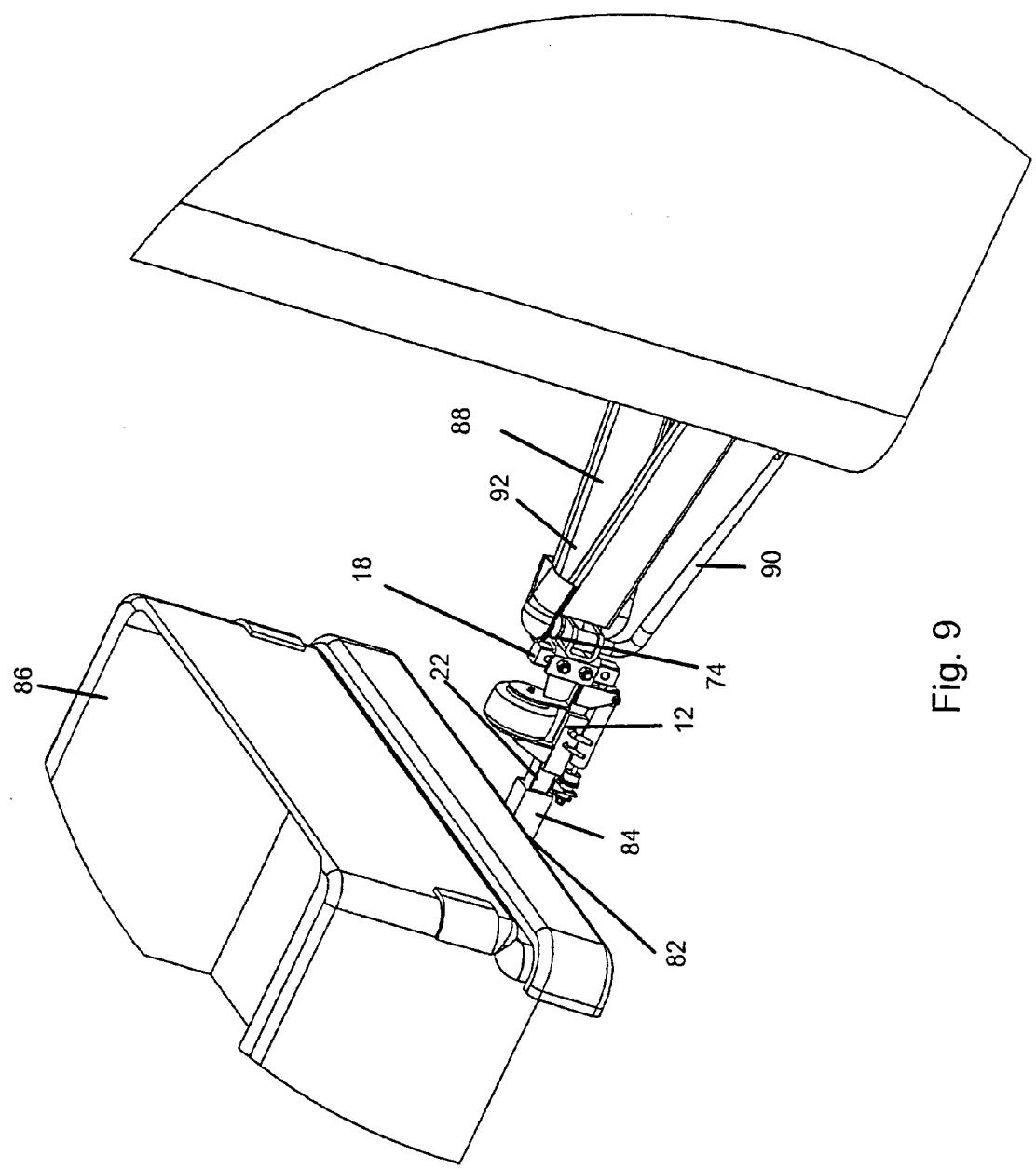
FIG. 9 is a side view of a tow bar assembly of the invention attached to a vehicle and a trailer.

If a counterweight distribution tow system 88 is used, such as that shown in FIG. 9, the spring is oriented on the top of the hitch assembly (FIG. 1, 5). For this system, the spring applies a downward force to overcome the upward force exerted by the counterweight system, such as torsion bars 90 on trailer tongue 92.

A user who needs to switch from a dead weight system to a counterweight system can easily disassemble the tow bar assembly from the hitch assembly to switch the orientation of the spring. The user simply unfastens the sleeve fasteners, removes the bar from the sleeve and turns the tow bar assembly 180°. The user next reinserts the bar into the sleeve and refastens the sleeve fasteners.

There are a number of advantages for the tow bar assembly of the invention. The tow bar assembly is easy to use, fitting between the receiver and the hitch assembly. The tow bar assembly is designed to use receivers and hitch assemblies already used for towing.

The tow bar assembly system counteracts the force applied by the trailer when driving. The spring at the tow bar assembly pivot joint counteracts forces translated by the trailer toward the vehicle. This reduces stress on the vehicle and the driver. The reduced stress decreases wear and tear on the vehicle and driver fatigue.

The tow bar assembly is easily changed to fit the type of weight distribution system for the trailer, such as between a dead weight system and a counterweight system. This allows an owner of multiple types of trailers to take advantage of the invention without requiring the purchase of multiple types of tow bar assemblies. The owner can keep the advantages of the tow bar assembly of the invention without buying multiple tow bars. An owner can also replace the trailer with another type of weight distribution system without needing to replace the tow bar, allowing the rental of different types of trailers and decreasing any downtime if repairs are needed on the road.

While the invention is shown in only one of its forms, it is not thus limited but is susceptible to various changes and modifications without departing from the spirit and scope of the invention.

What is claimed is:

1. A tow bar assembly for a vehicle comprising:
    a pivot joint having a first member pivotally engaging a second member, pivot openings in the first and second members, and a pivot pin extending through the pivot openings;
    first and second spring brackets being attached to one side of the pivot joint, the first spring bracket attaching to the first member, and the second spring bracket attaching to the second member;
    a spring being located between the first and second spring brackets and attached thereof;
    a pivot lock; and
    wherein the pivot lock temporarily prevents the pivot joint from pivoting, and the pivot joint pivots vertically.

2. A tow bar assembly for a vehicle of claim 1, wherein the pivot lock further comprises:
    gauge openings in the first and second members; and
    a gauge pin inserted through the gauge openings.

3. A tow bar assembly for a vehicle of claim 1, wherein the spring is a mechanical spring.

4. A tow bar assembly for a vehicle of claim 1, wherein the spring is a compressible fluid spring.

5. A tow bar assembly for a vehicle of claim 4, further comprising:
    a shock absorber attached to the first and second members opposite the spring.

6. A tow bar assembly for a vehicle of claim 1, further comprising:
    a hitch assembly fastened to a first end of the pivot joint.

7. A tow bar assembly for a vehicle of claim 6, further comprising:
  a receiver matingly engaging the pivot joint at a second end opposite the hitch assembly.

8. A tow bar assembly for a vehicle comprising:
  a first member having a tongue;
  a second member having a slot;
  a pivot joint having the slot pivotally engaging the tongue;
  a spring attaching to the first member and the second member;
  pivot openings in the tongue and the second member;
  a pivot pin extending through the pivot openings;
  a pivot lock comprising gauge openings in the tongue and second member, and a gauge pin inserted through the gauge openings; and
  wherein the pivot lock temporarily prevents the pivot joint from pivoting, and the pivot joint pivots vertically.

9. A tow bar assembly for a vehicle of claim 8, wherein the spring is a mechanical spring.

10. A tow bar assembly for a vehicle of claim 8, further comprising:
  a hitch assembly fastened to a first end of the pivot joint.

11. A tow bar assembly for a vehicle of claim 10, further comprising:
  a receiver matingly engaging a second end of the pivot joint opposite the hitch assembly.

12. A tow bar assembly for a vehicle comprising:
  a first member having a tongue;
  a second member having a slot;
  a pivot joint having the slot pivotally engaging the tongue;
  a spring attaching to the first member and the second member;
  pivot openings in the tongue and the second member;
  a pivot pin extending through the pivot openings;
  a pivot lock;
  wherein the pivot lock temporarily prevents the pivot joint from pivoting, and the pivot joint pivots vertically; and
  wherein the spring is a compressible fluid spring.

13. A tow bar assembly for a vehicle of claim 12, further comprising:
  a shock absorber attached to the first member and the second member opposite the compressible fluid spring.

* * * * *